United States Patent [19]

Mori et al.

[11] Patent Number: 4,705,451

[45] Date of Patent: Nov. 10, 1987

[54] ROBOT CONTROL APPARATUS

[75] Inventors: Shunji Mori; Shinobu Tajima; Atsushi Itoh, all of Aichi, Japan

[73] Assignee: Mitsubishi Denki Kabushiki Kaisha, Tokyo, Japan

[21] Appl. No.: 936,963

[22] Filed: Dec. 1, 1986

Related U.S. Application Data

[63] Continuation of Ser. No. 510,864, Jul. 5, 1983, abandoned.

[30] Foreign Application Priority Data

Jul. 2, 1982 [JP] Japan ................................ 57-114905

[51] Int. Cl.$^4$ .............................................. B25J 9/00
[52] U.S. Cl. ..................................... 414/70; 364/513; 414/786; 901/8
[58] Field of Search ....................... 414/730, 735, 786; 901/8, 50; 364/513; 318/568

[56] References Cited

U.S. PATENT DOCUMENTS

| | | | |
|---|---|---|---|
| 3,654,616 | 4/1972 | Dunne et al. | 901/8 X |
| 3,890,552 | 6/1975 | Devol et al. | 901/8 X |
| 4,229,136 | 10/1980 | Panissidi | 414/730 X |
| 4,308,584 | 12/1981 | Arai | 414/730 X |
| 4,445,022 | 4/1984 | Mori | 219/125.1 |
| 4,456,961 | 6/1984 | Price et al. | 364/513 |

OTHER PUBLICATIONS

"The Computer Control of Robot Manipulators", Richard P. Paul, Robot Manipulators: Mathematics, Programming, and Control, MIT Press, 1981.

Primary Examiner—Robert J. Spar
Assistant Examiner—Donald W. Underwood
Attorney, Agent, or Firm—Sughrue, Mion, Zinn, Macpeak & Seas

[57] ABSTRACT

A robot control apparatus including a first coordinate transformation unit for transforming an output from a setting unit for setting moving positions of a robot into information in a predetermined general coordinate system. A selector changes the destinations of output information from the first coordinate transformation unit dependent on the type of robot being controlled. A second coordinate transformation unit is provided having a plurality of transformation sections for transforming outputs in the general coordinate system from the first cooridnate transformation unit into information in a coordinate system inherent to the particular robot. The output from the first coordinate transformation unit is applied to one of the transformation sections which is selected by the selector. Robot drive signals are produced in response to output information from the second coordinate transformation unit.

4 Claims, 16 Drawing Figures

ROBOT CONTROL APPARATUS

This is a continuation of application Ser. No. 510,864, filed 7-5-83, abandoned.

BACKGROUND OF THE INVENTION

The present invention relates to an operation control apparatus for a robot mechanism.

A conventional control apparatus of the type described employs for controlling a robot both an orthogonal coordinate system, which relates directly to the environment around the robot, and a link coordinate system, which relates directly to the robot mechanism itself. The conventional control apparatus must include a device for transforming between these coordinate systems using coordinate transformation equations and inverse transformation equations.

Figure 1A:
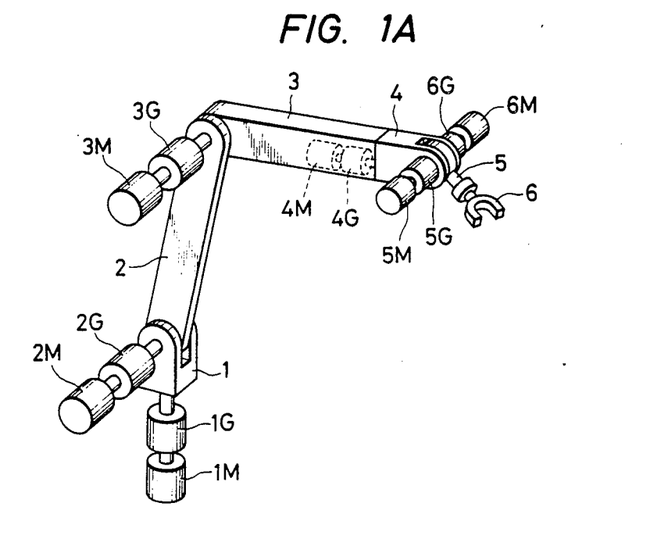
FIGS. 1A and 1B are perspective views of vertical six-axis and five-axis link robots, respectively.
Figure 1B:
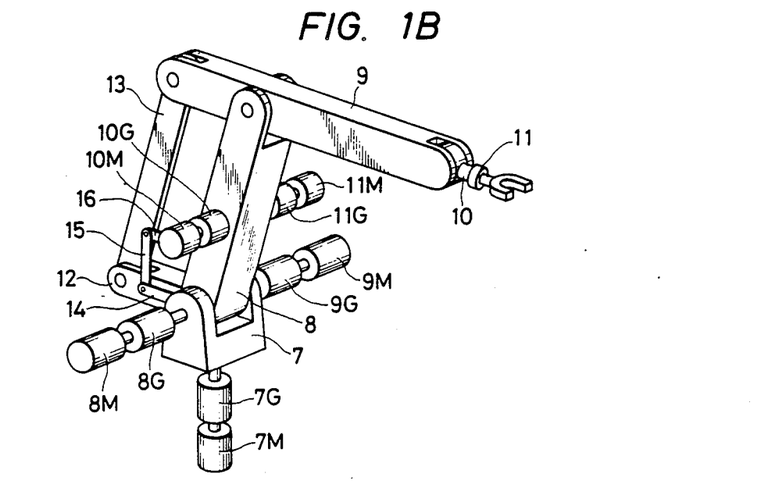

FIGS. 1A and 1B of the accompanying drawings illustrate two robots having different link mechanisms. FIG. 1A shows a vertical six-axis link or articulation robot including a drive motor 1M for bodily turning the robot. The drive motor 1M is coupled through a speed reducer 1G to a robot turntable 1. The robot also has a drive motor 2M for driving an arm 2 through a speed reducer 2G, a motor 3M for driving an arm 3 upwardly and downwardly through a speed reducer 3G, a motor 4M for rotating an arm 4 through a speed reducer 4G, a motor 5M for bending an arm 5 through a speed reducer 5G, and a motor 6M for swiveling an arm 6 through a speed reducer 6G.

FIG. 1B illustrates a vertical five-axis link or articulation robot, The robot has a drive motor 7M for rotating a turntable 7 through a speed reducer 7G, a drive motor 8M for moving an arm 8 back and forth through a speed reducer 8G, and a drive motor 9M for enabling parallel links 12 and 13 to move an arm 9 upwardly and downwardly through a speed reducer 9G. The robot also includes drive motors 10M and 11M for moving arms 10 and 11 through speed reducers 10G and 11G, with the drive motor 10M being connected through parallel links 14, 15 and 16 to the turntable 7 and with the drive motor 11M also being connected to the turntable 7 through the same links 14, 15 and 16.

Figure 2A:
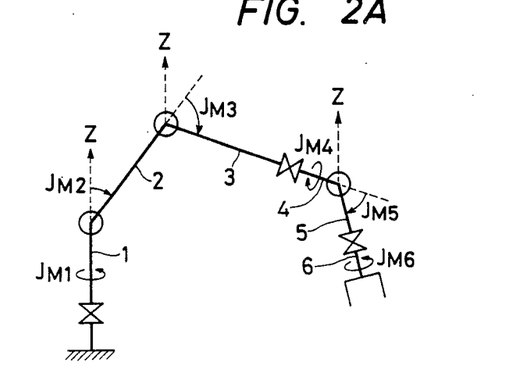
FIGS. 2A and 2B are diagrams showing coordinate systems directly related to the robots shown in FIGS. 1A and 1B, respectively.
Figure 2B:
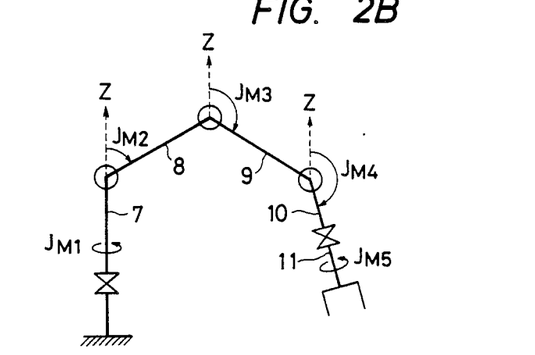

Coordinate systems inherent to the robot mechanisms shown in FIGS. 1A and 1B, that is, the most convenient coordinate system for the particular mechanism at hand, are shown respectively in FIGS. 2A and 2B. In FIGS. 2A and 2B, those elements denoted by reference numerals 1 through 11 correspond respectively to the arms 1 through 11 illustrated in FIGS. 1A and 1B. Designated by $J_{Mn}$ (n=1 through 6) are angles of rotation of the motors from corresponding reference points.

In the mechanism of FIG. 1A, the motor for driving the arm 3 is mounted on the arm 2, and thus the position of the arm 3 is dependent on the attitude of the arm 2. Likewise, the motors for driving the arms 5 and 6 are mounted on the arm 4, and the positions of the arms 5 and 6 are thus dependent on the attitude of the arm 4. Accordingly, a coordinate system inherent to the robot mechanism shown in FIG. 1A has reference points for the angles $J_{M3}$ and $J_{M5}$, on extensions of the arms 2 and 4, respectively, as illustrated in FIG. 2A.

With the robot mechanism of FIG. 1B, the arm 9 remains fixed in position as the attitude of the arm 8 varies. The driver motors 10M and 11M are also free from any influence of the attitude of the arm 9 through the link mechanism. Therefore, a coordinate system inherent to the robot mechanism shown in FIG. 1B has reference points for the angles $J_{M2}$, $J_{M3}$ and $J_{M4}$ along the direction of the Z-axis.

As described above, the most convenient coordinate system is determined entirely by the arrangement of the robot mechanism. Therefore, the coordinate transformation equations for transforming from the orthogonal coordinate system at the outside controller of the robot into a coordinate system which uses the motors as references, and the corresponding inverse coordinate transform equations, vary from robot to robot. It has been conventional practice to develop and design a new control apparatus for each respective new robot type.

SUMMARY OF THE INVENTION

It is therefore an object of the present invention to provide a robot control apparatus capable of controlling a plurality of different robot mechanisms with a single robot control arrangement.

Another object of the present invention is to provide a robot control apparatus capable of controlling a plurality of different robot mechanisms simply by changing specified parameters.

Still another object of the present invention is to provide a robot control apparatus allowing a control system for a totally new robot mechanism to be designed through fewer steps of development and design.

The above and other objects are achieved with the invention by a robot control apparatus having a first coordinate transformation unit for transforming an output from a setting unit for setting moving positions of a robot into information in a predetermined general coordinate system, a selector for changing destinations of output information from the first coordinate transformation unit dependent on the specific arrangement of the robot to be controlled, a second coordinate transformation unit having a plurality of transformation sections for transforming outputs in the general coordinate system used by the first coordinate transformation unit into coordinate system information inherent to robots having different control coordinate systems with the output from the first coordinate transformation unit being applied to that one of the transformation sections which is selected by the selector, and a device for producing robot drive signals in response to output information from the second coordinate transformation unit.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Preferred embodiments of the present invention will now be described.

Figure 3:
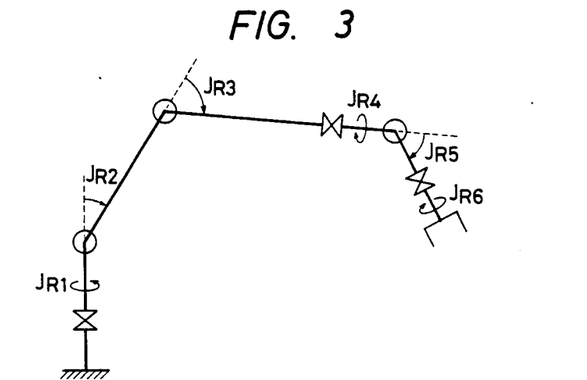
FIG. 3 is a diagram showing a general coordinate system $J_R$ for a vertical six-axis link robot.

For controlling robot mechanisms having respective coordinate systems as shown in FIGS. 2A and 2B with a single control system, a coordinate system $J_R$ (which is the same as that shown in FIG. 2A) is defined as illustrated in FIG. 3. A set (matrix) of transformation parameters g are provided, the values of which are dependent on the particular robot arrangement employed. The parameters g are used for transforming link angles $J_{R1}$ to $J_{Rn}$ in the coordinate system $J_R$ into link angles $J_{M1}$ to $J_{Mn}$. By establishing $J_{MA}=g_A(J_R)$ and $J_{MB}=g_B(J_R)$, where the suffix A is indicative of the robot type A shown in FIG. 1A, the suffix B is indicative of the robot type B shown in 1B, $g_A$ is a transformation parameter set for the robot type A, and $g_B$ is a transformation parameter set for the robot type G, the different robot mechanisms A and B can be controlled with a single control system. The coordinate system $J_R$ will hereinafter be referred to as a general coordinate system.

According to the present invention, a predetermined general coordinate system $J_R$ is established, link angles are computed with reference to the general coordinate system $J_R$, and the information thus computed is transformed into the coordinate systems which are directly related to the robots to be controlled. A specific transformation parameter set g should be prepared for each type of robot to be controlled.

Figure 4:
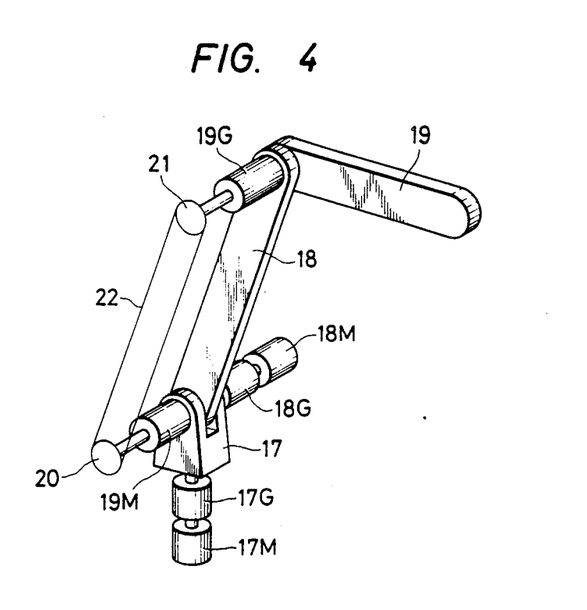
FIG. 4 is a perspective view of a vertical link robot of a construction different from those of the robots illustrated in FIGS. 1A and 1B.

FIG. 4 is illustrative of a robot mechanism different in construction from those shown in FIGS. 1A and 1B. The robot mechanism of FIG. 4 includes a drive motor 17M for rotating a turntable 17 through a speed reducer 17G, a drive motor 18M for moving an arm 18 back and forth through a speed reducer 18G, and a drive motor 19M for moving an arm 19 upwardly and downwardly through a power transmission device composed of timing sprockets 20 and 21 and a timing belt or chain 22 laid around the timing sprockets 20 and 21. Rotary power from the motor 19M is transmitted through a speed reducer 19G to the arm 19. In the illustrated mechanism, the drive motor 19M for driving the arm 19 is mounted on the turntable 17 for reducing the inertia of the arms to thus improve the controllability thereof. The speed reducer 19G is mounted on the arm 18 to reduce variations in the link angles due to vibration and backlash of the power transmission elements 20, 21 and 22.

Figure 5:
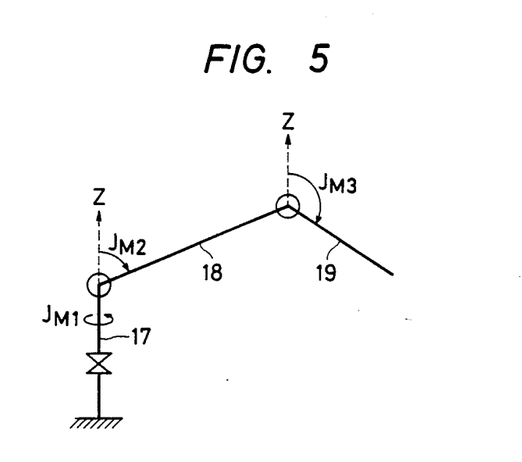
FIG. 5 is a diagram of a coordinate system directly related to the robot shown in FIG. 4.

FIG. 5 shows a coordinate system inherent to the robot mechanism illustrated in FIG. 4. Since the motor 19M for driving the arm 19 is supported on the turntable 17, a reference point for an angle $J_{M3}$ is oriented in the direction of the Z-axis. When the arm 18 is turned through an angle $\Delta\theta$, the sprocket 21 rotates through $\Delta\theta$ relative to the arm 18 since the power transmission mechanism 20, 21 and 22 is a parallel link mechanism. With the speed reduction ratio of the speed reducer 19G being 1/G, arm 19 rotates through an angle of $\Delta\theta/G$ relative to the arm 18, and complex corrective actions are necessary, taking into account the direction of rotation. These corrective actions can be expressed by a parameter set $g_c$:

$$g_c = \begin{pmatrix} 1 & 0 & 0 & 0 & 0 & 0 \\ 0 & 1 & 0 & 0 & 0 & 0 \\ 0 & 1+\delta/G & 1 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \end{pmatrix}$$

where $\rho$ is $+1$ or $-1$ depending on the particular robot mechanism, and the suffix c indicates the robot type C shown in FIG. 4.

$J_{Mc}$ can be controlled by $g_c$ and $J_R$ since $J_{Mc}=g_c(J_R)$, where:

$$J_{Mc} = \begin{pmatrix} J_{M1} \\ J_{M2} \\ J_{M3} \\ J_{M4} \\ J_{M5} \\ J_{M6} \end{pmatrix}$$

If the corrective parameter set is $g_c$, then:

$J_{M1}=J_{R1}$,
$J_{M2}=J_{R2}$,
$J_{M3}=(\delta/G)J_{R2}+J_{R3}$, and
$J_{M4}=J_{M5}=J_{M6}=0$.

The state of the coefficient $\delta$ can be determined as follows: It is assumed that the arms 18 and 19 in the robot of FIG. 4 rotate counterclockwise in a positive direction through angles $J_{M2}$ and $J_{M3}$, respectively. Where the speed reducer 19G is arranged such that when the sprocket 21 rotates counterclockwise, the arm 19 rotates in the positive direction, $\delta=-1$, and $J_{M3}=J_{R3}-J_{R2}/G$. Where the speed reducer 19G is arranged such that when the sprocket 21 rotates clockwise, the arm 19 rotates in the negative direction or clockwise, $\delta=+1$ and $J_{M3}=J_{R2}/G+J_{R3}$.

For generally expressing the position of the hand of the robot in the $J_R$ coordinate system (general coordinate system), transformation equations matrices M and $M^{-1}$, for transforming between $J_R$ and (X, Y, X) and ($\alpha$, $\beta$, $\gamma$) can be determined by employing orthogonal coordinates (X, Y, Z) and Euler angles ($\alpha$, $\beta$, $\gamma$).

More specifically, $J_R=M^{-1}(P)$, and $P=M(J_R)$, where $$P = \begin{pmatrix} X \\ Y \\ Z \\ \alpha \\ \beta \\ \gamma \end{pmatrix} \text{ and } J_R = \begin{pmatrix} J_{R1} \\ J_{R2} \\ J_{R3} \\ J_{R4} \\ J_{R5} \\ J_{R6} \end{pmatrix}$$

Figure 6A:
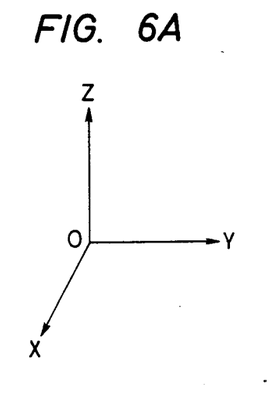
FIGS. 6A through 6C are diagrams illustrative of coordinate systems explanatory of Euler angles.
Figure 6B:
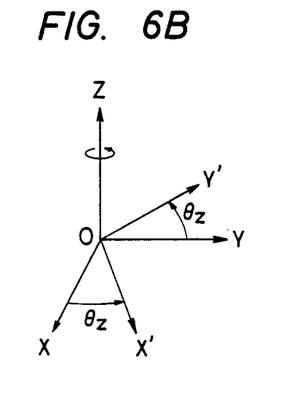

The Euler angles ($\alpha$, $\beta$, $\gamma$) are three elements generally used for indicating conditions (position and attitude) of any desired coordinate system in space, particularly for expressing the attitude of such a coordinate system, and employ the expression ($\alpha$, $\beta$, $\gamma$). For example, when a coordinate system O−X, Y, Z as shown in FIG. 6A is rotationally transformed into another coordinate system O−X', Y', Z as illustrated in FIG. 6B, the latter coordinate system O−X', Y', Z is expressed as being at an attitude of $(\alpha, \beta, \gamma) = (z, 0, 0)$. Stated otherwise, rotation about the Z axis is expressed by $\alpha$, rotation about the Y axis by $\beta$, and rotation about the X axis by $\gamma$.

Figure 6C:
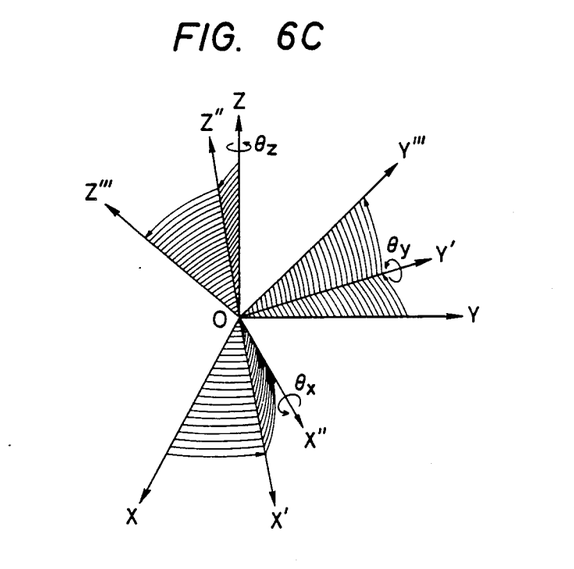

When the coordinate system O−X, Y, Z is rotated about the Z axis through an angle $\theta_z$ into the coordinate system O−X', Y', Z, which is then rotated about a Y'-axis through $\theta_y$ into a coordinate system O−X'', Y', Z'', which is thereafter rotated about an X'' axis through $\theta_x$ into a coordinate system O−X'', Y''', Z''', as shown in FIG. 6C, the last coordinate system can be expressed as $(\alpha, \beta, \gamma) = (\theta_z, \theta_y, \theta_x)$.

The $J_R$ (general) coordinate system and an orthogonal coordinate system will be described for controlling a robot, especially the hand of the robot.

It is assumed that the robot hand or end effector is positioned at a point $P_i$ in the orthogonal coordinate system, and is set at an attitude as determined by Euler angles $\alpha_i, \beta_i, \gamma_i$ with respect to the X, Y and Z axes.

$$P_i = \begin{pmatrix} X_i \\ Y_i \\ Z_i \\ \alpha_i \\ \beta_i \\ \gamma_i \end{pmatrix}$$

The angle of $J_R$ at this time can be found as: $J_{Ri} = M^{-1}(P_i)$.

Let another point $P_j$ be given by:

$$P_j = \begin{pmatrix} X_j \\ Y_j \\ Z_j \\ \alpha_j \\ \beta_j \\ \gamma_j \end{pmatrix}$$

and $J_{Rj} = M^{-1}(P_j)$.

For controlling the robot to move from the point $P_i$ to the point $P_j$ along the straight line $P_iP_j$, the following conditions should be met:

$$P_N = P_i + P_V \cdot V \cdot \Delta T,$$

where $P_N$ is the position after a small interval of time $\Delta T$, V is the speed, and $P_V$ is a coefficient representative of ratios of movement along the axes. The execution of:

$$J_{RN} = M^{-1}(P_N),$$

and the foregoing control operation should be repeated until the robot reaches the final point $P_j$. In this manner, the robot can be controlled employing the coordinate system $J_R$, and also can be controlled with $$J_M = gJ_R$$

by selecting an appropriate parameter set g for a robot having a mechanism which operates using a different coordinate system than the $J_R$ system.

Figure 7:
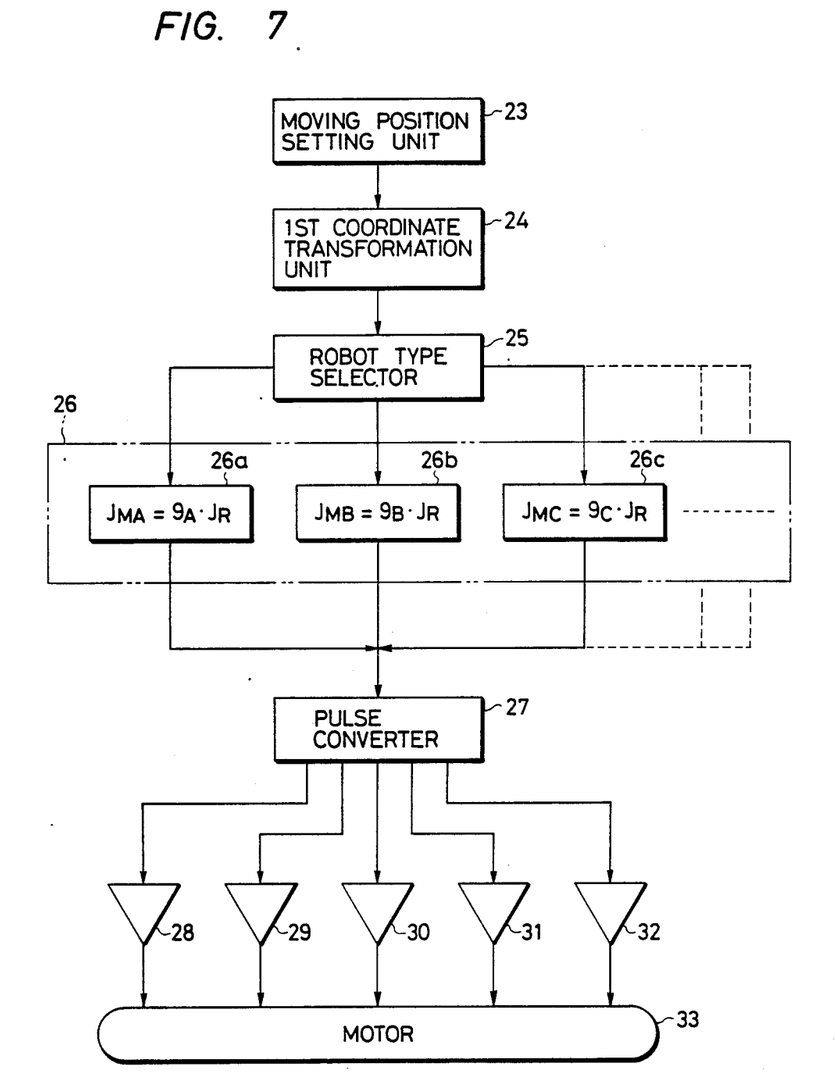
FIG. 7 is a block diagram of an apparatus for controlling a plurality of robots of different constructions.
Figure 8:
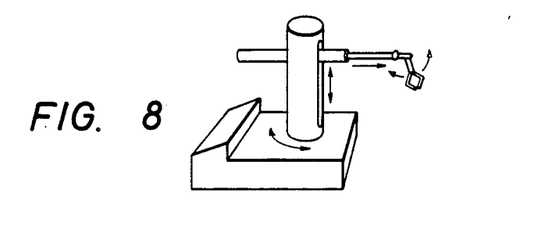
FIGS. 8 through 12 show various examples of robots to which the invention may be applied.
Figure 9:
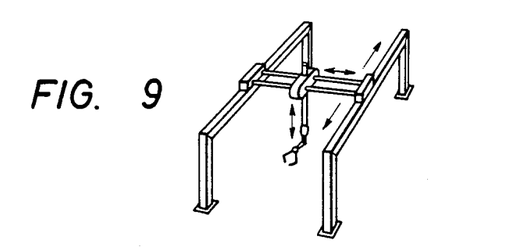
Figure 10:
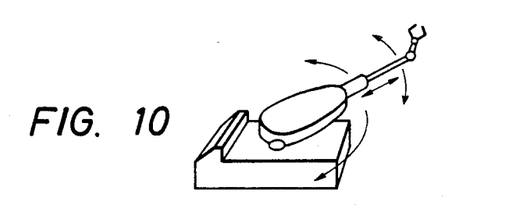

FIG. 7 shows a robot control apparatus according to the present invention. Target positions for the hand of the robot are computed from time to time based on the control coordinate system (orthogonal coordinate system) for the robot hand. More specifically, an output (in the orthogonal coordinate system) from a position setting unit 23 for computing $P_N$ is applied to a first coordinate transformation unit 24. The first coordinate transformation unit 24 transforms the orthogonal coordinate system output into general coordinate system information using the equation $J_R = M^{-1}(P_N)$ to compute the angle of the robot arm. An output from the first coordinate transformation unit 24 is delivered to a second coordinate transformation unit 26 through a selector 25 for setting the robot type to be controlled and inputting a parameter set corresponding to a coordinate system inherent to the type of robot to be controlled.

The second coordinate transformation unit 26 has stored therein in advance a plurality of parameter sets corresponding to many robots having different mechanisms (coordinate systems), and has, for example, a transformation section 26a for the robot shown in FIG. 1A, and a transformation section 26b for the robot shown in FIG. 1B, and a transformation section 26c for the robot shown in FIG. 4.

The output from the first coordinate transformation unit 24 is transformed, for instance, by the transformation section 26c into the coordinate system inherent to the robot to be controlled. Such coordinate transformation is carried out using the equation $J_{Mc} = g_c(J_R)$. Thereafter, the transformed output is converted by a pulse converter 27 into drive pulses for the robot drive motors. The pulses are then distributed through servo-amplifiers 28 through 32 to each robot drive motor 33 for controlling the various operations of the robot.

Parameter sets $g_a$ and $g_b$ for the robot types A and B shown in FIGS. 1A and 1B can be expressed as follows:

$$g_a = \begin{pmatrix} 1 & 0 & 0 & 0 & 0 & 0 \\ 0 & 1 & 0 & 0 & 0 & 0 \\ 0 & 0 & 1 & 0 & 0 & 0 \\ 0 & 0 & 0 & 1 & 0 & 0 \\ 0 & 0 & 0 & 0 & 1 & 0 \\ 0 & 0 & 0 & 0 & 0 & 1 \end{pmatrix}$$

$$g_b = \begin{pmatrix} 1 & 0 & 0 & 0 & 0 & 0 \\ 0 & 1 & 0 & 0 & 0 & 0 \\ 0 & 1 & 1 & 0 & 0 & 0 \\ 0 & 1 & 1 & 0 & 1 & 0 \\ 0 & 0 & 0 & 0 & 0 & 1 \\ 0 & 0 & 0 & 0 & 0 & 0 \end{pmatrix}$$

The parameter set $g_a$ shows that the general coordinate system $J_R$ and the coordinate system $J_M$ inherent to the robot are in one-to-one correspondence with each other. With regard to the parameter set $g_b$, the coordinate system $J_R$ and $J_M$ differ from each other, but $J_{Rj}$ remains unchanged as $J_{Ri}$ moves. Regarding the parameter set $g_c$, the coordinate system $J_R$ and $J_M$ differ from each other, and $J_{Rj}$ changes as $J_{Ri}$ moves.

While in the foregoing the present invention has been described as being applied to a vertical multi-axis link robot, the invention is applicable to horizontal multi-axio link robots, cylindrical coordinate system robots, orthogonal-type robots, and robots having other mechanisms. The invention can also be applied to advantage in combinations of such robots.

Figure 11:
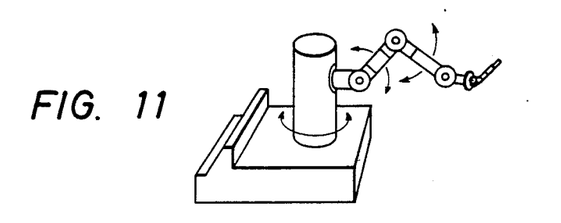
Figure 12:
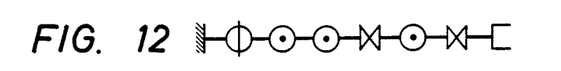

FIGS. 8 through 12 show various examples of robots with which the present invention may be used to advantage. The robot of FIG. 8, in which the manipulator arm can be moved up and down and rotated on a base, employs the cylindrical coordinate system. That shown in FIG. 9, in which the manipulator is movable back and forth, up and down and sideways, employs Cartesian coordinates. The polar coordinate system is inherent to the robot arrangement of FIG. 10 wherein the manipulator arm can be extended and retracted and rotated in two orthogonal directions. FIG. 11 shows an articulated manipulator similar to those discussed above. Finally, FIG. 12 shows schematically an articulated manipulator which is a slight variation on the articulated manipulators discussed above.

With the arrangement of the present invention, a robot control system utilizes a general coordinate system $J_R$ and a plurality of predetermined parameter groups g are employed for coordinate transformation from the $J_R$ system of the $J_M$ system. Therefore, a plurality of robots of different constructions can be controlled by a single robot control system. A robot control system for use with an entirely new robot of different structure can be designed in fewer steps.

Although a certain preferred embodiment has been shown and described, it should be understood that many changes and modifications may be made therein without departing from the scope of the appended claims.

We claim:

1. A robot control apparatus of a type adapted to control plural robots, comprising:
  a moving position setting unit for setting moving positions of a hand of a robot based on a coordinate system of the hand;
  a first coordinate transformation unit connected to said moving position setting unit for transforming an output from said setting unit into information in a predetermined general coordinate system;
  a selector connected to said first coordinate transformation unit for changing destinations of output information from said first coordinate transformation unit in dependence upon which of said plural robot is to be controlled;
  a second coordinate transformation unit connected to said selector and having a pluarality of transformation sections for transforming outputs of said general coordinate system into coordinate system information inherent to that one or ones of said plural robots to be presently controlled, the output from said first coordinate transformation unit being applied selectively to said transformation sections by said selector; and
  means connected to said second coordinate transformation unit for producing signals for driving said one or ones of said robots to be presently controlled, in response to output information from said second coordinate transformation unit.

2. A robot control apparatus according to claim 1, wherein said plurality of transformation sections store different parameter sets corresponding to different robot types.

3. A robot control apparatus according to claim 1, wherein said device for producing said robot drive signals comprises a pulse distributor for converting the output from said second coordinate transformation unit into drive pulses for drive motors of said robots, and servoamplifiers for supplying said drive pulses from said pulse distributor to said drive motors of said robots.

4. A robot control method, comprising;
  generating robot hand movement instructions in one of a plurality of robot coordinate systems;
  transforming said movement instructions into corresponding movement instructions in a predetermined general coordinate system;
  selecting one of a plurality of robots, said selected robot being designated to perform a controlled sequence of operations according to said movement instructions, said selected robot having an inherent robot coordinate system;
  transforming said movement instructions in said predetermined general coordinate system into corresponding movement instructions in said inherent robot coordinate system; and
  controlling said selected robot according to said movement instructions in said inherent robot coordinate system.

* * * * *